United States Patent
Herzog et al.

(10) Patent No.: US 8,503,467 B2
(45) Date of Patent: Aug. 6, 2013

(54) METHODS AND DEVICES FOR GENERATING A REORGANIZED TRANSPORT DATASTREAM

(75) Inventors: Norman Herzog, Berlin (DE); Jens Rusch-Ihwe, Brandenburg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 362 days.

(21) Appl. No.: 12/905,908

(22) Filed: Oct. 15, 2010

(65) Prior Publication Data
US 2011/0090923 A1   Apr. 21, 2011

(30) Foreign Application Priority Data

Oct. 16, 2009   (DE) .................. 10 2009 049 611
Dec. 8, 2009    (DE) .................. 10 2009 057 365

(51) Int. Cl.
*H04L 12/56* (2006.01)

(52) U.S. Cl.
USPC .................. 370/412; 370/395.64; 375/240.01

(58) Field of Classification Search
USPC ................ 370/395.64, 412–418; 375/240.01
See application file for complete search history.

(56) References Cited

U.S. PATENT DOCUMENTS

| 2007/0165709 A1* | 7/2007 | Walker et al. ................ 375/219 |
| 2008/0186850 A1  | 8/2008 | Lee |
| 2009/0028081 A1* | 1/2009 | Song et al. .................. 370/310 |

FOREIGN PATENT DOCUMENTS

EP   1 239 632 B1   9/2002

* cited by examiner

*Primary Examiner* — Hoon J Chung
(74) *Attorney, Agent, or Firm* — Christensen O'Connor Johnson Kindness PLLC

(57) ABSTRACT

Methods and devices are disclosed for generating a reorganized transport datastream from transport data packets of an original transport datastream displaces the first transport data packets contained in an original transport datastream into determined new positions within the reorganized transport datastream. The new positions are determined dependent upon a first data rate at which the first transport data packets of the reorganized transport datastream are stored in second buffers and a second data rate at which the first transport data packets of the reorganized transport datastream are read out from the second buffers.

11 Claims, 3 Drawing Sheets ature of the ATSC-M/H-transport datastream, a spacing distance from the new position of the ATSC-transport data packet of the same program and/or of the same data type newly inserted into the

METHODS AND DEVICES FOR GENERATING A REORGANIZED TRANSPORT DATASTREAM

CROSS-REFERENCE TO RELATED APPLICATIONS

The present application claims priority to German Applications DE 10 2009 049 611.4 filed on Oct. 16, 2009, and DE 2009 057 0365.8 on Dec. 8, 2009, the entire disclosures of which are hereby incorporated by reference.

BACKGROUND

In a transport datastream which transmits data simultaneously for stationary and mobile receivers on the basis of the US American Advanced-Television-Systems-Committee Mobile/Handheld (ATSC-M/H) standard, portions are reserved for the transmission of data for mobile receivers, and portions are reserved for the transmission of data for stationary receivers. In view of the limited energy resources of the mobile receivers, the transmission of data for mobile receivers is implemented in bursts with a given burst duration and within a given burst cycle. This requirement is reflected in the data structure of the ATSC-M/H-transport datastream by rigidly reserving given portions of the ATSC-M/H-transport datastream (assigned M/H timeslots), for example, for the transmission of TV program data for mobile receivers, while the remaining free portions (non-assigned M/H timeslots, portions between the M/H timeslots) can be used arbitrarily for the transmission of program data to stationary receivers.

Since the data for mobile receivers must be inserted into an existing ATSC transport datastream for stationary receivers, the data for stationary receivers contained in the existing ATSC-M/H-transport datastream must first be removed and buffered in order to create space within the transport datastream for M/H time slots for the transmission of program data to mobile receivers. After the insertion of the data for mobile receivers into the ATSC-M/H-transport datastream, the buffered data for stationary receivers are once again stored, in some cases in new positions, in the portions of the ATSC-M/H-transport datastream provided for the transmission of data for stationary receivers.

On the basis of this re-positioning of the data for stationary receivers within the ATSC-M/H-transport datastream, ATSC-transport data packets, which, for example, belong respectively to one program and to one data type—audio or video data—, can come to be disposed in close proximity within the ATSC-M/H-transport datastream. This would lead to an overflow of a buffer for the storage of ATSC-transport data packets of the same program and of the same data type disposed upstream of a decoder, because this buffer provides a buffer capacity, which is typically limited and is specially designed for the maximal data rate of the respective program, which is, however, slower than the data rate of the transport datastream as a whole. This is disadvantageously associated with a loss of TV program data on the transmission path. Conversely, the newly positioned data for stationary receivers which belong respectively to one program and to one data type can be displaced so far within the ATSC-M/H-transport datastream and can be positioned so far away from one another that the buffer for the storage of ATSC-transport data packets of the same program and the same data type is emptied.

SUMMARY

An object of the present invention is to develop methods and devices for re-positioning data for stationary receivers especially within an ATSC-M/H-transport datastream without a loss of ATSC-transport data packets in a subsequent buffer stage. In several embodiments discussed further herein, this object, among others, can be achieved by a method for generating a reorganized transport datastream with the features of claim 1 and by a device for generating a reorganized transport datastream with the features of claim 9.

In order to prevent an overflow of a buffer for the storage of ATSC-transport data packets disposed upstream of a decoder and accordingly a loss of ATSC-transport data packets, the parameters relevant for the overflow of the buffer, namely a first data rate at which the buffer are filled with transport data packets containing data for stationary receivers, and a second data rate at which the ATSC-transport data packets containing data for stationary receivers are read out from the buffer, are included in the determination of the new positions for the ATSC-transport data packets with data for stationary receivers in the ATSC-M/H-transport datastream.

Since the TV program data for stationary receivers for every program and/or for every data type, that is, for audio or video data, are each buffered in a buffer disposed upstream of a decoder, referred to below as the first buffer, the new positions within the ATSC-M/H-transport datastream must be determined in each case independently from one another for every program and/or for every data type.

In a first embodiment in accordance with aspects of the present invention, in each case, two successive ATSC-transport data packets newly inserted into the ATSC-M/H-transport datastream, which are each associated with the same program and data type, are repositioned in the ATSC-M/H-transport datastream with a minimum spacing distance, which corresponds to the ratio of the first data rate to the second data rate. However, this represents only one possible solution, because, under some circumstances, the currently predominating buffer assignment at the time of the repositioning of an ATSC-transport data packet in the ATSC-M/H-transport datastream is minimal, so that, in view of the buffer reserves available as a result, a spacing distance from the new position of the ATSC-transport data packet of the same program and/or of the same data type newly inserted into the ATSC-M/H-transport datastream which is smaller than the minimum spacing distance would be realizable.

In a second embodiment in accordance with aspects of the present invention, the associated buffer assignment of the respective first buffer is determined in advance for every possible re-positioning of the ATSC-transport data packet to be newly inserted into the ATSC-M/H-transport datastream. Accordingly, the ATSC-transport data packet to be newly inserted into the ATSC-M/H-transport datastream is delayed with regard to its re-positioning until a re-positioning is determined, at which the associated buffer assignment of the respective first buffer is smaller than the buffer capacity of the first buffer. The new position of the ATSC-transport data packet displaced within the ATSC-M/H-transport datastream, which presupposes a smaller buffer assignment of the respective first buffer than the buffer capacity of the first buffer, is dependent upon the first and second data rate, the new position of the last ATSC-transport data packet displaced into the ATSC-M/H-transport datastream of the same program and of the same data type and the buffer assignment of the respective first buffer associated with the new position of the last ATSC-transport data packet of the same program and of the same data type last displaced within the ATSC-M/H-transport datastream.

The ATSC-transport data packets assigned with data for stationary receivers, which are referred to below as first ATSC-transport data packets, are already available in the original ATSC-M/H-transport datastream and must be displaced within the ATSC-M/H-transport datastream into the first portions of the reorganized ATSC-M/H-transport datastream provided for the transmission of data for stationary receivers, in order to be inserted ATSC-transport data packets assigned with data for mobile receivers, which are referred to below as second ATSC-transport data packets, into the second portions of the reorganized ATSC-M/H-transport datastream provided for the transmission of TV program data for mobile receivers.

In several embodiments, the calculation of the new positions for the first ATSC-transport data packets to be inserted into the reorganized ATSC-M/H-transport datastream is preferably implemented on the basis of the MPEG-2-buffer model according to ISO/IEC 13818-1.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this present invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended only as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to obscure unnecessarily various aspects of the present disclosure. Furthermore, it will be appreciated the embodiments of the present disclosure may employ any of the features described herein.

Figure 1:
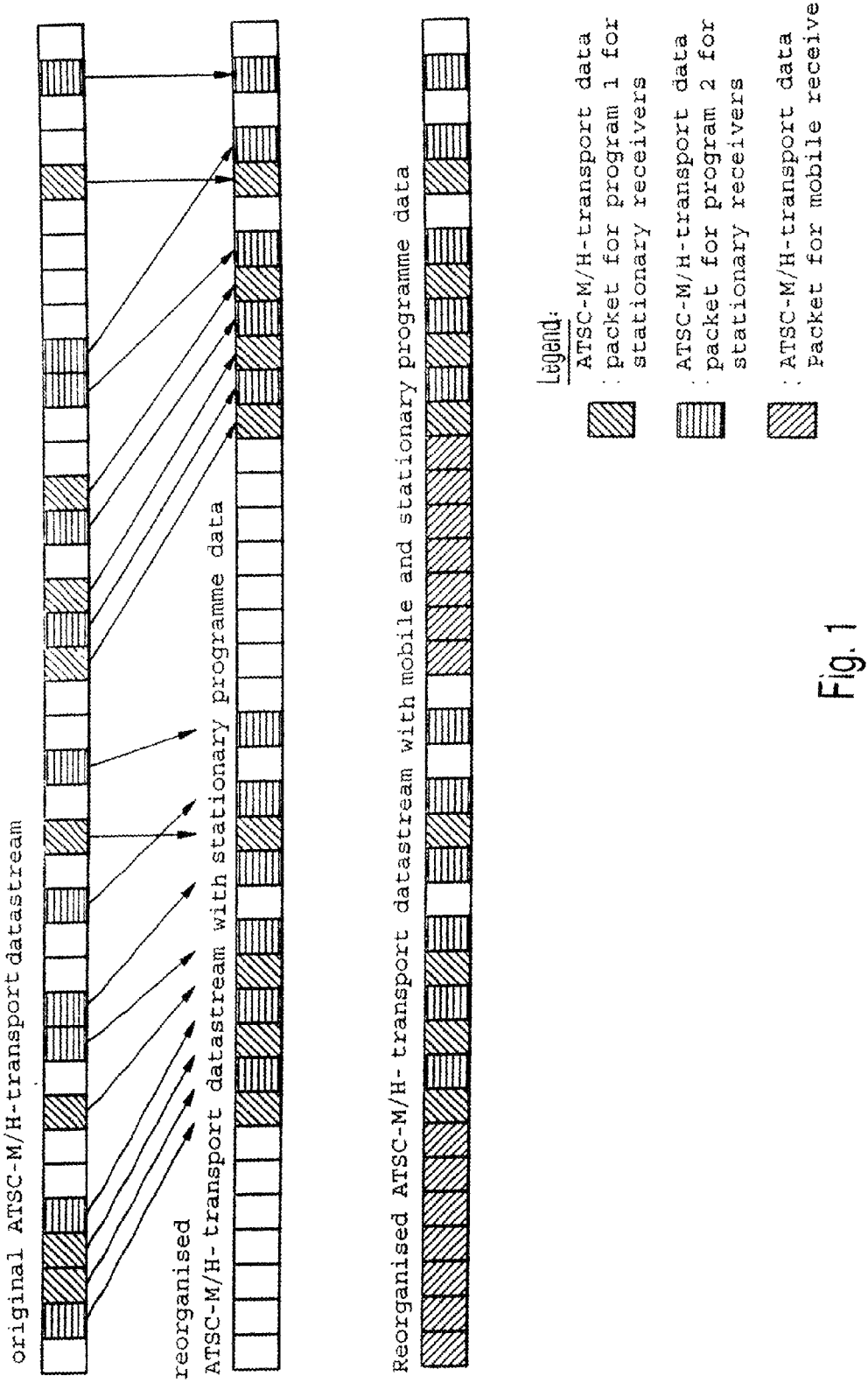
FIG. 1 shows one example of a data structure of an ATSC-M/H-transport datastream reorganized according to aspects of the present invention.
Figure 3:
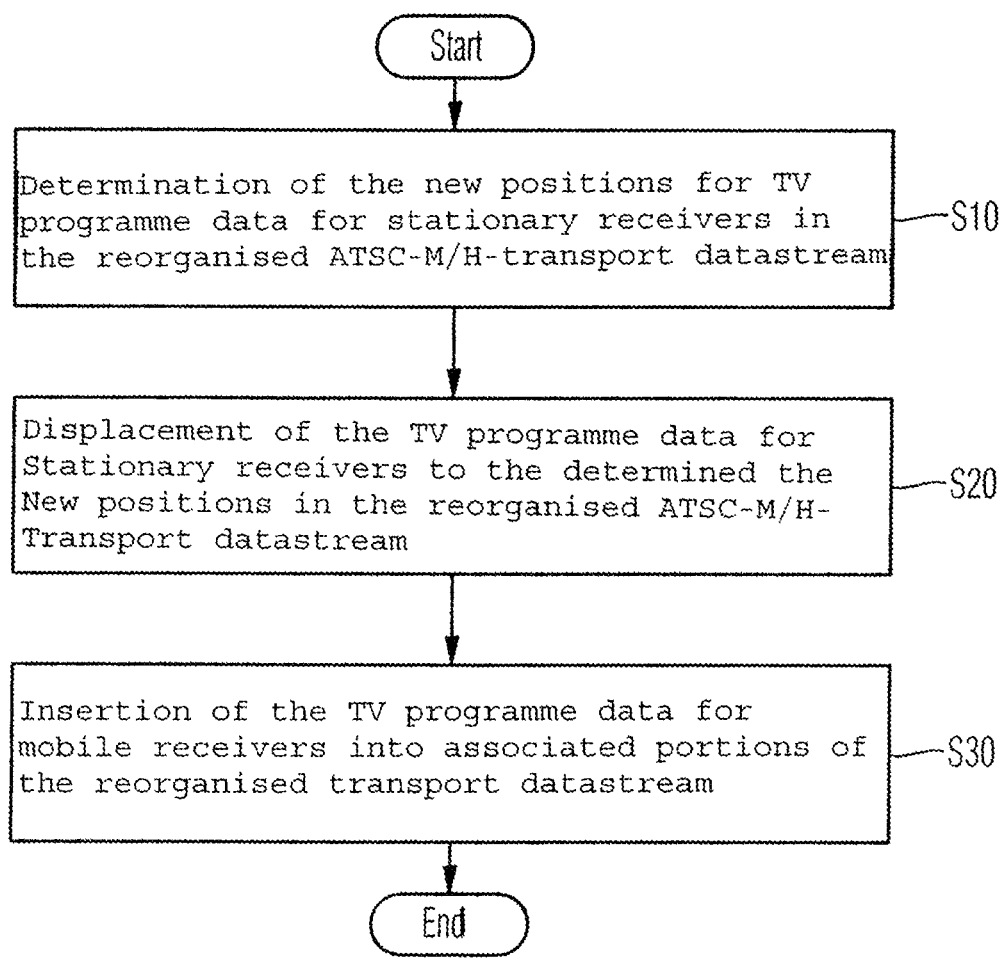
FIG. 3 shows one example of a flow chart of a method according to aspects of the present invention for generating a reorganized transport datastream.

Turning now to FIG. 3, there is illustrated a flow diagram of one embodiment of a method for generating a reorganized transport datastream. In the first method step S10, the new positions for the first ATSC-transport data packets assigned with data for stationary receivers within the first portions of the ATSC-M/H-transport datastream provided for the transmission of first ATSC-transport data packets are determined. One example of the structure of the transport datastream is shown in FIG. 1.

Figure 2:
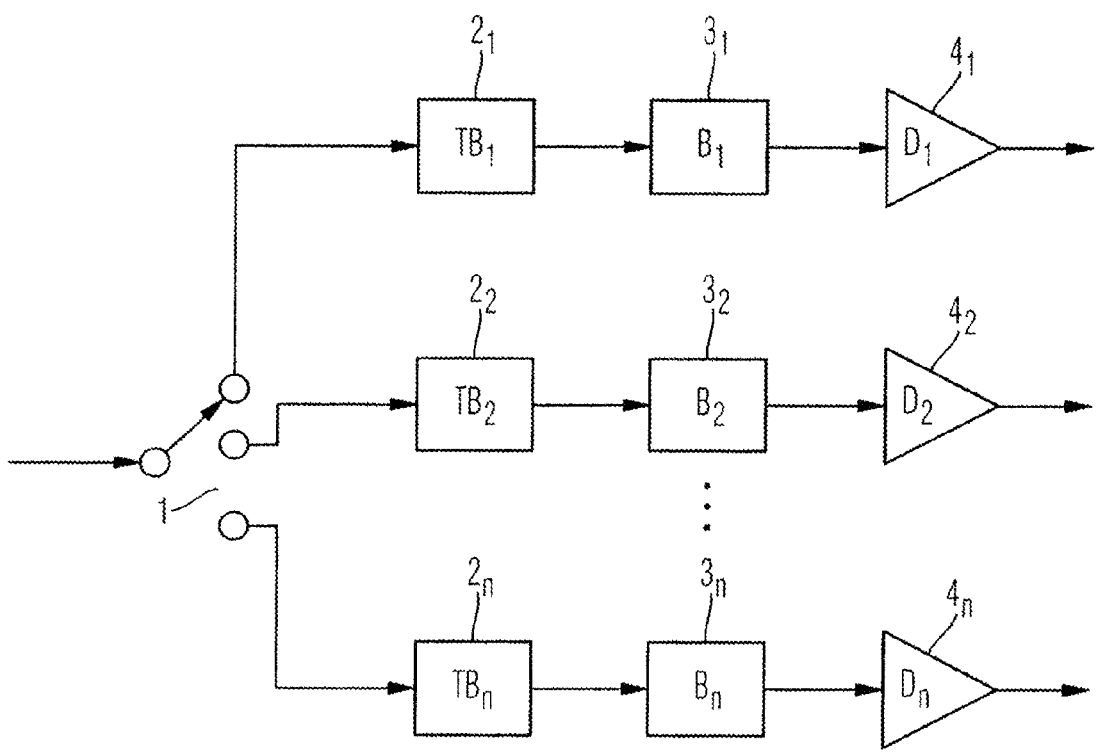
FIG. 2 shows one example of a block circuit diagram of an MPEG-2-buffer model according to ISO/IEC 13818-1.

Since the transport buffers (Transport Buffers $TB_1$, $TB_2, \ldots, TB_n$) associated in each case with the individual programs and/or data types, which are referred to below as first buffers ($2_1, 2_2, \ldots, 2_n$) and are shown in FIG. 2, provide a relatively small buffer capacity (512 bytes) on the basis of the MPEG-2-buffer model according to ISO/IEC 13818-1, and the first data rate, at which the first buffers ($2_1, 2_2, \ldots, 2_n$) are filled in each case with first ATSC-transport data packets of a given program and/or data type, is faster than the second data rate, at which the first ATSC-transport data packets are read out from the respective first buffers ($2_1, 2_2, \ldots, 2_n$), an overflow of the first buffer ($2_1, 2_2, \ldots, 2_n$) associated with the respective program and/or data type can easily occur in the case of first transport data packets of the same program and/or of the same data type positioned close together within the ATSC-M/H-transport datastream.

To prevent this, in one embodiment of the present invention, the first ATSC-transport data packets associated in each case with one program and/or data type which contain data for stationary receivers are displaced respectively into new positions within the ATSC-M/H-transport datastream which each provide a given minimum spacing distance from one another. According to equation (1), the minimum spacing distance is obtained from the ratio of the first data rate to the second data rate.

$$\text{Minimum-spacing} = \frac{\text{first-data-rate}}{\text{second-data-rate}} \qquad (1)$$

In this manner, the number of the first ATSC-transport data packets which are stored in the respective first buffer ($2_1, 2_2, \ldots, 2_n$) per unit of time, is smaller than or equal to the number of the first ATSC-transport data packets which are removed from the respective first buffer ($2_1, 2_2, \ldots, 2_n$) per unit of time, and the buffer assignment of the respective first data buffer ($2_1, 2_2, \ldots, 2_n$) remains either constant or decreases.

The first data rate, at which a respective first buffer ($2_1, 2_2, \ldots, 2_n$) is filled with first ATSC-transport data packets, is obtained from the worst-case (worst-case), if the first ATSC-transport data packets of the ATSC-M/H-transport datastream are completely stored within a single first buffer ($2_1, 2_2, \ldots, 2_n$) over a given time portion, and corresponds to the data rate of the ATSC-M/H-transport datastream, namely 19.39 Mbit/s. The second data rate, at which the first ATSC-transport data packets are read out from the respective first buffer ($2_1, 2_2, \ldots, 2_n$), is obtained, for example, on the basis of the MPEG-2-buffer model according to ISO/IEC 13818-1 at 2 Mbit/s. Accordingly, a value of 19.39 Mbit/s/2 Mbit/s=10 ATSC-transport data packets should be set as the minimum spacing distance between two new positions for two first ATSC-transport data packets of the same program and/or of the same data type to be newly inserted in each case successively into the ATSC-M/H-transport datastream.

In a second embodiment of the present invention, for every available new position in the first portion of the ATSC-M/H-transport datastream, the buffer assignment resulting in the respective first buffer ($2_1, 2_2, \ldots, 2_n$) is calculated on the basis of the MPEG-2-buffer model according to ISO/IEC 13818-1 and compared with the buffer capacity of the first buffer ($2_1$, $2_2, \ldots, 2_n$). If the calculated buffer assignment is smaller than the buffer capacity of the respective first buffer ($2_1, 2_2, \ldots, 2_n$), the respective buffered first ATSC-transport data packet can be displaced into the associated new position in the ATSC-M/H-transport datastream. Otherwise, the associated buffer assignment in the respective first buffer ($2_1, 2_2, \ldots, 2_n$) is once again calculated and compared with the buffer capacity of the first buffer ($2_1, 2_2, \ldots, 2_n$) for the next available new position within the ATSC-M/H-transport datastream The current buffer assignment of the respective first buffer ($2_1, 2_2, \ldots, 2_n$) to be calculated, which is referred to below as CurrBuffAss and relates to the currently investigated position within the ATSC-M/H-transport datastream, which is referred to as CurrPos, is obtained according to equation (2) from the previously calculated buffer assignment of the respective first buffer ($2_1, 2_2, \ldots, 2_n$) which is referred to below as PrevBuffAss, and relates to the position within the ATSC-M/H-transport datastream last occupied with an ATSC-transport data packet of the same program and/or of the same data type, which is referred to below as PrevPos, with the addition of the intervening inflow of first ATSC-transport data packets of the same program and/or of the same data type into the respective first buffer ($2_1, 2_2, \ldots, 2_n$), which is referred to as Inflow, and with the deduction of the intervening outflow of first ATSC-transport data packets of the same program and/or of the same data type from the respective first buffer ($2_1, 2_2, \ldots, 2_n$), which is referred to as Outflow.

$$CurrBuffAss = PrevBuffAss + Inflow - Outflow \quad (2)$$

The Inflow of first ATSC-transport data packets of the same program and/or of the same data type into the respective first buffer ($2_1, 2_2, \ldots, 2_n$) between the current newly positioned and the previously newly positioned first ATSC-transport data packets in the ATSC-M/H-transport datastream of the same program and/or of the same data type corresponds to the data volume of precisely one first ATSC-transport data packet and amounts to 188 bytes.

The Outflow is obtained from the second data rate, at which the first ATSC-transport data packets are read out from respective first buffers ($2_1, 2_2, \ldots, 2_n$), multiplied by the time interval between two first ATSC-transport data packets of the same program and/or of the same data type newly positioned in succession within the reorganized ATSC-M/H transport datastream. This time interval is obtained from the difference between the current position to be calculated and the previously calculated position CurrPos-PrevPos multiplied by the data volume of a first ATSC-transport data packet, namely 188 bytes, and divided by the first data rate, at which the respective first buffer ($2_1, 2_2, \ldots, 2_n$) is written with a first ATSC-transport data packet. The Outflow is therefore obtained according to equation (3).

$$Outflow = second\text{-}data\text{-}rate \cdot \frac{CurrPos - PrevPos}{first\text{-}data\text{-}rate} \cdot 188 \text{ bytes} \quad (3)$$

The current buffer assignment to be calculated of the respective first buffer is obtained by substituting the relationship for the Outflow according to equation (3) into equation (2), and the relationship in equation (4) is obtained.

$$CurrBuffAss = PrevBuffAss + 188 \text{ bytes} - \frac{second\text{-}data\text{-}rate}{first\text{-}data\text{-}rate} \cdot (CurrPos - PrevPos) \cdot 188 \text{ bytes} \quad (4)$$

Since the multiplex buffers (multiplex buffers ($MB_1, MB_2, \ldots, MB_n$ in FIG. 2)) connected downstream of the respective transport buffers ($2_1, 2_2, \ldots, 2_n$) and referred to below as second buffers ($3_1, 3_2, \ldots, 3_n$) in which audio data are buffered, are significantly smaller than the second buffers ($3_1, 3_2, \ldots, 3_n$) in which video data are buffered, the probability of emptying the respective second buffer in the second buffers ($3_1, 3_2, \ldots, 3_n$) filled with audio data is greater than in the second buffers ($3_1, 3_2, \ldots, 3_n$) filled with video data, if the first ATSC-transport data packets assigned with audio data are displaced too far within the ATSC-M/H-transport datastream.

In order to prevent an emptying of the second buffers ($3_1, 3_2, \ldots, 3_n$) filled with audio data, in calculating the new positions for the first ATSC-transport data packets to be displaced into the reorganized ATSC-M/H-transport datastream, the first ATSC-transport data packets assigned with audio data should be planned into the individual first portions of the ATSC-M/H-transport datastream with primary priority, and the first ATSC-transport data packets assigned with video data should be planned into the individual first portions of the ATSC-M/H-transport datastream with secondary priority.

First ATSC-transport data packets assigned with data other than audio/video data should also be taken into consideration during the planning into the individual portions of the ATSC-M/H-transport datastream with a priority corresponding to their associated buffer capacity.

In the next method step S20, the first ATSC-transport data packets of the original ATSC-M/H-transport datastream associated respectively with the individual programs and/or data types according to the first line in FIG. 1 are displaced to the respective new positions in the reorganized ATSC-M/H-transport datastream calculated in the previous method step S10 according to the second line in FIG. 1.

In the method step S30, the second ATSC-transport data packets assigned with TV program data for mobile receivers, which are typically supplied as a datastream with IP/UDP protocol, are inserted according to the third line in FIG. 1 into the second portions of the reorganized ATSC-M/H-transport datastream provided for the transmission of second ATSC-transport data packets.

Finally, via a switch 1, the individual first ATSC-transport data packets are subdivided corresponding to their association with a given program and/or data type into the signal paths associated with the respective program and/or data type with the associated first buffers ($2_1, 2_2, \ldots, 2_n$), second buffers ($3_1, 3_2, \ldots, 3_n$) and coders ($4_1, 4_2, \ldots, 4_n$).

The principles, representative embodiments, and modes of operation of the present disclosure have been described in the foregoing description. However, aspects of the present disclosure which are intended to be protected are not to be construed as limited to the particular embodiments disclosed. It should therefore be appreciated that embodiments described herein can also be used with other buffer models alongside the MPEG-2-buffer model according to ISO/IEC 13818-1. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the present invention in which an exclusive property or privilege is claimed are defined as follows:

1. A method for generating a reorganized transport datastream from transport data packets of an original transport datastream comprising:
    displacing first transport data packets contained in the original transport datastream into determined new positions within the reorganized transport datastream,
    wherein the new positions are determined dependent upon a ratio between a first data rate at which the first transport data packets of the reorganized transport datastream are stored in first buffers, and a second data rate at which the first transport data packets of the reorganized transport datastream are read out from the first buffers,
    wherein the first transport data packets of data of which a buffer capacity in a second buffer connected downstream of the respective first buffer is low are displaced with a higher priority into the first portions of the reorganized transport datastream, and the first transport data packets of data of which the buffer capacity in a second buffer connected downstream of the respective first buffer is high are displaced with a lower priority into the first portions of the reorganized transport datastream.

2. The method according to claim 1,
    wherein the new positions of the first transport data packets within the reorganized transport datastream are determined for the first transport data packets of each program and/or data type in each case independently of one another.

3. The method according to claim 2,
    wherein a spacing distance between the new positions within the reorganized transport datastream associated with two of the first transport data packets of a program and/or of a data type transmitted in succession is obtained from the ratio of the first data rate to the second data rate.

4. The method according to claim 2,
    wherein the new position for each first transport data packet associated with a respective program and/or data type and to be inserted into the reorganized transport datastream is delayed in the reorganized transport datastream until a buffer assignment of each first buffer associated with the respective program and/or data type of the first transport data packet to be inserted, determinable in advance from the new position and the ratio of the first data rate to the second data rate, is smaller than the first buffer's capacity.

5. The method according to claim 4,
    wherein a calculation of the positions for the first transport data packets displaced into the reorganized transport datastream is implemented on the basis of the MPEG-2-buffer model according to ISO/IEC 13818-1.

6. The method according to claim 1,
    wherein a spacing distance between the new positions within the reorganized transport datastream associated with two of the first transport data packets of a program and/or of a data type transmitted in succession is obtained from the ratio of the first data rate to the second data rate.

7. The method according to claim 1,
    wherein the new position for each first transport data packet associated with a respective program and/or data type and to be inserted into the reorganized transport datastream is delayed in the reorganized transport datastream until a buffer assignment of each first buffer associated with a respective program and/or data type of the first transport data packet to be inserted, determinable in advance from the new position and the ratio of the first data rate to the second data rate, is smaller than the first buffer's capacity.

8. The method according to claim 7,
    wherein a calculation of the new positions for the first transport data packets displaced into the reorganized transport datastream is implemented on the basis of the MPEG-2-buffer model according to ISO/IEC 13818-1.

9. The method according to claim 1,
    wherein second transport data packets not contained in the original transport datastream are inserted into second portions of the reorganized transport datastream provided for the second transport data packets, and the first transport data packets are displaced into first portions of the reorganized transport datastream differing from the second portions.

10. The method according to claim 1,
    wherein the first transport data packets are TV program data for stationary receivers according to the US American Advanced-Television-Systems-Committee standard, and second transport data packets are TV program data for mobile receivers according to the US American Advanced-Television-Systems-Committee Mobile/Handheld standard.

11. A device configured to generate the reorganized transport datastream from the first transport data packets of the original transport datastream by carrying out the method of claim 1.

* * * * *